(12) United States Patent
Naven et al.

(10) Patent No.: US 8,050,265 B2
(45) Date of Patent: Nov. 1, 2011

(54) MULTICAST DATA PACKET SWITCHING METHOD

(75) Inventors: Finbar Naven, Cheadle Hulme (GB); Stephen John Marshall, Oldham (GB)

(73) Assignee: Virtensys Limited, Cheshire (GB)

( * ) Notice: Subject to any disclaimer, the term of this patent is extended or adjusted under 35 U.S.C. 154(b) by 246 days.

(21) Appl. No.: 12/343,688

(22) Filed: Dec. 24, 2008

(65) Prior Publication Data
US 2009/0175286 A1 Jul. 9, 2009

Related U.S. Application Data

(60) Provisional application No. 61/019,386, filed on Jan. 7, 2008.

(30) Foreign Application Priority Data

Jan. 7, 2008 (GB) .................................. 0800207.3

(51) Int. Cl.
*H04L 12/50* (2006.01)
*H04L 12/28* (2006.01)
*H04L 12/54* (2006.01)

(52) U.S. Cl. ........ 370/390; 370/374; 370/382; 370/383; 370/417; 370/429

(58) Field of Classification Search ........................ None
See application file for complete search history.

(56) References Cited

U.S. PATENT DOCUMENTS

| | | | | |
|---|---|---|---|---|
| 5,689,505 A | * | 11/1997 | Chiussi et al. | 370/388 |
| 6,101,187 A | * | 8/2000 | Cukier et al. | 370/396 |
| 6,201,792 B1 | * | 3/2001 | Lahat | 370/236 |
| 6,795,886 B1 | * | 9/2004 | Nguyen | 710/310 |
| 2004/0233933 A1 | * | 11/2004 | Munguia | 370/473 |
| 2006/0104275 A1 | | 5/2006 | Dohm | 370/390 |
| 2007/0177621 A1 | | 8/2007 | Chang et al. | 370/412 |

FOREIGN PATENT DOCUMENTS

EP 0 707 397 A2 4/1996

(Continued)

OTHER PUBLICATIONS

Search Report for Application No. GB0800207.3, dated Mar. 20, 2008, (2 pages).

(Continued)

*Primary Examiner* — Daniel J Ryman
*Assistant Examiner* — Thinh Tran
(74) *Attorney, Agent, or Firm* — Barnes & Thornburg LLP

(57) ABSTRACT

A method of switching data packets between an input and a plurality of outputs of a switching device. The switching device comprises a memory arranged to store a plurality of data structures, each data structure being associated with one of said outputs. The method comprises receiving a first data packet at said input, and storing said first data packet in a data structure associated with an output from which said data packet is to be transmitted. If said first data packet is intended to be transmitted from a plurality of said outputs, indication data is stored in each data structure associated with an output from which said first data packet is to be transmitted, but said first data packet is stored in only one of said data structures. The first data packet is transmitted from said data structure to the or each output from which the first data packet is to be transmitted.

26 Claims, 12 Drawing Sheets

FOREIGN PATENT DOCUMENTS

| | | |
|---|---|---|
| EP | 1 198 098 A2 | 4/2002 |
| GB | 2 342 007 A | 3/2000 |
| WO | WO 97/31461 A1 | 8/1997 |
| WO | WO 01/89140 A2 | 11/2001 |

OTHER PUBLICATIONS

Duan, Haoran et al., "A High-performance OC-12/OC-48 Queue Design Prototype for input-buffered ATM Switches", INFOCOM '97, vol. 1, Apr. 7, 1007, pp. 20-28.

Notification of Transmittal of the International Search Report and the Written Opinion International Searching Authority for Application No. PCT/GB2008/004042, dated Mar. 31, 2009, (15 pages).

* cited by examiner

| Port | Virtual Channel | Traffic Class |
|---|---|---|
| Port X | VC0 | TC2 |
| Port X | VC1 | TC3 |
| Port A | VC0 | TC2 |
| Port A | VC1 | TC3 |
| Port B | VC0 | TC3 |
| Port B | VC1 | TC2 |

MULTICAST DATA PACKET SWITCHING METHOD

The present application claims priority, under 35 U.S.C. §119(a), to British Patent Application No. 0800207.3, filed Jan. 7, 2008, and claims the benefit under 35 U.S.C. §119(e) of U.S. Provisional Application No. 61/019,386, filed Jan. 7, 2008, both of which are hereby expressly incorporated by reference in their entirety.

The present invention relates to a method of switching data packets between an input and a plurality of outputs of a switching device.

It is often necessary to send data between devices in a computer system, for example it is often necessary to connect a processing device to a plurality of input and output devices. Appropriate data communication is achieved by connecting the devices in such a way as to allow them to send data to each other over a physical link, which may be a wired link or a wireless link.

It is known in the art to use a switch to route data packets from an output of one device to inputs of one or more other devices. Such a switch comprises one or more ingress ports arranged to allow the data packets to be received by the switch, and a plurality of egress ports arranged to allow the data to be transmitted from the switch. Such a switch may contain an ingress buffer to store incoming data packets as they are waiting to be switched to one or more appropriate egress ports. It is known for such an ingress buffer to contain distinct spaces to queue data packets based upon the egress port from which they are to be transmitted, such that a data packet destined for a particular egress port is stored in a different space from a data packet destined for a different egress port.

It is often important for the correct operation of the devices connected to a switch that ordering is maintained between data packets. That is, it is important that data packets transmitted from the same egress port are transmitted in the order in which they arrived at an ingress port of the switch.

In general terms, there are two types of data packets, a first type is referred to as unicast, and a second type is referred to as multicast. A unicast data packet specifies a single destination, whereas a multicast data packet specifies a plurality of destinations.

Writing a data packet to an appropriate queue in an ingress buffer of the type described above typically requires one clock cycle; a unicast data packet can therefore be written into the appropriate queue in the ingress buffer, as determined by the data packet's destination even if the received data packets are all so small that their arrival rate requires all of the write bandwidth available on the ingress buffer (i.e. a data packet arrives during each clock cycle).

It is known, when receiving a multicast data packet at an ingress port, to write that multicast data packet to each queue that corresponds to an egress ports from which the data packet is to be transmitted. By writing the multicast data packet to each queue, any subsequent data packets received at the ingress port and written to those queues will be sent after the multicast data packet. Although such an approach maintains the ordering requirement, this method can cause bandwidth and storage problems at the ingress port, given that a single multicast data packet is written to two separate queues thereby consuming additional bandwidth and storage. More specifically, writing a single data packet to a plurality of queues requires a plurality of write cycles equivalent to the number of queues to which the data packet is to be written. For example, if a multicast data packet specifies three egress ports, three write cycles are required to write the multicast data packet into each of the corresponding queues. This can cause problems when the write bandwidth is limited. This is illustrated in the case where data packets arrive at a particular ingress port in consecutive clock cycles immediately after a multicast data packet has arrived at that ingress port, and the switching device is still occupied in processing the multicast data packet, thereby causing a bottleneck.

An example of one kind of physical device interface is PCI Express. PCI Express is a device interface format designed to replace existing PCI and PCI-X device interfaces. With PCI and PCI-X, each device is connected to a motherboard by way of a shared bus, placing restrictions on the bandwidth that a device can use, as each device must wait for space on the shared bus. PCI Express is designed around a shared switch rather than a shared bus, with each device having its own direct access to the switch via a link. The switch routes traffic between any communicating devices.

It is an object of an embodiment of the present invention to obviate or mitigate one or more of the problems outlined above.

According to a first aspect of the present invention, there is provided a method of switching data packets between an input and a plurality of outputs of a switching device, the switching device comprising a memory arranged to store a plurality of data structures, each data structure being associated with one of said outputs, the method comprising: receiving a first data packet at said input; storing said first data packet in a data structure associated with an output from which said data packet is to be transmitted; if said first data packet is intended to be transmitted from a plurality of said outputs, storing indication data in each data structure associated with an output from which said data packet is to be transmitted, said data packet being stored only in one of said data structures; and transmitting said data packet from said data structure to the or each output from which the data packet is to be transmitted.

An advantage of the first aspect of the present invention is that a data packet received at an input to be transmitted from a plurality of outputs need only be stored in one data structure. The bandwidth required by known methods to store the data packet in each data structure corresponding with all of the outputs from which the data packet is to be transmitted is freed for use by subsequent data packets received at the input. The indication data that is stored in each data structure associated with a data structure from which the data packet is to be transmitted can ensure that any ordering requirements are maintained.

The indication data may comprise a single bit indicator. The indication data may comprise master indication data and the method may further comprise storing the master indication data in the data structure where the first data packet is stored. The indication data may also comprise slave indication data and the method may further comprise storing the slave indication data in each data structure associated with an output from which the first data packet is to be transmitted except for the data structure in which the first data packet is stored.

The method may further comprise receiving an ordered plurality of data packets and storing each of the plurality of data packets in one of the data structures.

If the first data packet is intended to be transmitted from a plurality of said outputs, the method may further comprise storing said slave indication data alongside one data packet stored in each data structure except the data structure in which said first data packet is stored, said one data packet in each data structure being stored after said first data packet is stored, and before any other data packet is stored in the respective data structure.

The method may further comprise processing each of said data structures to determine a data packet to be transmitted from an output associated with each data structure and if a data packet to be transmitted from one of said data structures has associated indication data, delaying transmission of said data packet until it is determined that data packets to be transmitted from each of said data structures has associated indication data.

The method may further comprise identifying a data packet having associated master indication data and no slave indication data and transmitting said identified data packet to each output from which it is to be transmitted.

The method may further comprise determining if slave indication data is associated with an entry in any data structure other than that storing said data packet having associated master indication data and no slave indication and clearing slave indication data in each data structure except said data structure.

The output may be an egress port, a virtual channel on a port, a traffic class on a virtual channel on a port or defined in any other convenient way, given the requirements of the data transmission infrastructure in which the switching device is used.

The method may further comprise storing data structure indication data indicating a data structure in which a data packet to be transmitted from a plurality of outputs is to be stored.

The switching device may comprise two outputs, each having an associated data structure and the data structure indication data may comprise one bit of data. The switching device may comprise n outputs, each having an associated data structure and the data structure indication data may comprise a data value capable of indicating n values. The data structure indication data may be an n-way register.

The method may further comprise updating said data structure indication data in a circular manner, starting at one data structure, proceeding through the remaining data structures, and then moving back to the starting data structure, each time a multicast data packet is received.

The data structures may be queues.

The switching device may be a PCI express switch.

According to a second aspect of the present invention, there is provided a computer apparatus for switching data, the apparatus comprising, a memory storing processor readable instructions and a processor configured to read and execute instructions stored in said memory wherein the processor readable instructions comprise instructions controlling the computer to carry out a method according to any of the embodiments of the present invention described above.

According to a third aspect of the present invention, there is provided a switching device for switching data packets between an input and a plurality of outputs comprising, at least one input for receiving data packets including a first data packet, a plurality of outputs from which received data packets are to be transmitted and a memory arranged to store a plurality of data structures, each data structure being associated with one of said outputs. The switching device is configured to store indication data such that if a received data packet is intended to be transmitted from a plurality of said outputs, indication data is stored in each data structure associated with an output from which said data packet is to be transmitted.

The switching device may be arranged such that said indication data comprises a single bit indicator. The switching device may be arranged such that the indication data comprises master indication data and the switching device may be further arranged to store the master indication data in the data structure where the first data packet is stored. The switching device may also be arranged such that the indication data comprises slave indication data and the switching device may be further arranged to store the slave indication data in each data structure associated with an output from which the first data packet is to be transmitted except for the data structure in which the data packet is stored.

The switching device may be arranged to receive an ordered plurality of data packets and store each of said plurality of data packets in one of said data structures.

The switching device may be arranged to determine whether said first data packet is intended to be transmitted from a plurality of said outputs and if said first data packet is intended to be transmitted from a plurality of said outputs, to store said slave indication data alongside one data packet stored in each data structure except the data structure in which said first data packet is stored, said one data packet in each data structure being received after said first data packet is stored, and before any other data packet is stored in the respective data structure.

The switching device may be arranged to process each of said data structures to determine a data packet to be transmitted from an output associated with each data structure and if a data packet to be transmitted from one of said data structures has associated indication data, to delay transmission of said data packet until it is determined that data packets to be transmitted from each of said outputs have associated indication data.

The memory of the switching device may be arranged to store data structure indication data indicating a data structure in which a data packet to be transmitted from a plurality of outputs is to be stored.

According to a fourth aspect of the present invention, there is provided an apparatus for switching data packets between an input and a plurality of outputs comprising, at least one input for receiving data packets, a plurality of outputs from which received data packets are to be transmitted, means for receiving a first data packet at said input, means for storing said first data packet in a data structure associated with an output from which said data packet is to be transmitted, means for determining whether said first data packet is intended to be transmitted from a plurality of said outputs, and if said first data packet is intended to be transmitted from a plurality of said outputs for storing indication data in each data structure associated with an output from which said first data packet is to be transmitted, said first data packet being stored in only one of said data structures and means for transmitting said first data packet from said data structure to the or each output from which the first data packet is to be transmitted.

It will be appreciated that features described in connection with a particular aspect of the present invention may be used in connection with other aspects of the invention.

It will be appreciated that aspects of the present invention can be implemented in any convenient way including by way of suitable hardware and/or software. For example, a switching device arranged to implement the invention may be created using appropriate hardware components. Alternatively, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

Preferred embodiments of the present invention will now be described, by way of example, with reference to the accompanying drawings in which.

Data packets being transferred on a particular physical link between PCI Express devices can use a selected traffic class, which is mapped to a specified virtual channel on the particular physical link. On a particular physical link, independent buffer resources exist for each virtual channel at an ingress port of a device. A plurality of traffic classes can be mapped to a particular virtual channel such that the plurality of traffic classes mapped to the particular virtual channel share buffer resources allocated to the virtual channel. The mapping between virtual channels and traffic classes is a one-to-many relationship (a traffic class can only be mapped to one virtual channel on a particular link).

Figure 1:
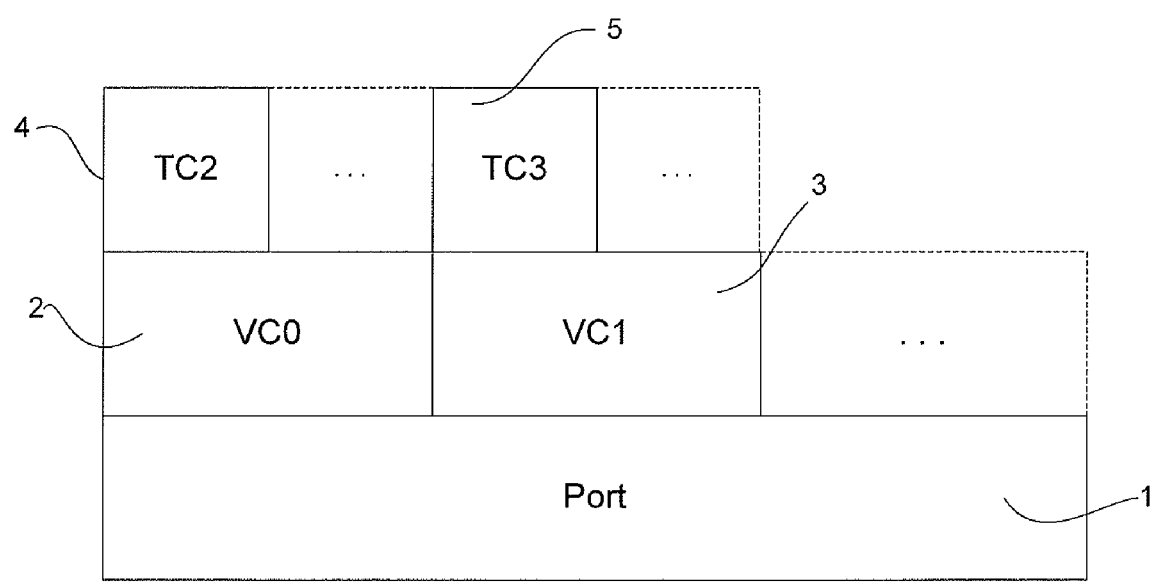
FIG. 1 is a schematic representation showing relationships between traffic classes, virtual channels and a port in a system arranged to transmit data packets between devices.

FIG. 1 shows a port 1 of a switch. The port 1 supports two virtual channels, VC0 2 and VC1 3. The two virtual channels VC0 2 and VC1 3 each have a single associated traffic class. A traffic class TC2 4 is mapped to the virtual channel VC0 2 while a traffic class TC3 5 is mapped to the virtual channel VC1 3. If the port 1 is an ingress port, given the described mappings, a data packet of traffic class TC2 arriving at the port 1 will arrive on the virtual channel VC0 and a data packet of traffic class TC3 will arrive on the virtual channel VC1.

As indicated above each virtual channel has the ability to support a plurality of traffic classes. Additionally, in general terms, each port (and consequently each link) can support up to eight virtual channels.

In general terms, at a switch, data packets received at an ingress port are placed in an ingress queue so that they can be processed for scheduling to an egress port. It is important to maintain ordering between data packets of a given traffic class which are destined for the same egress port, such that a data packet received at time N is forwarded after a data packet received at a time N−1 and before a data packet received at a time N+1.

Figures 2, 3:
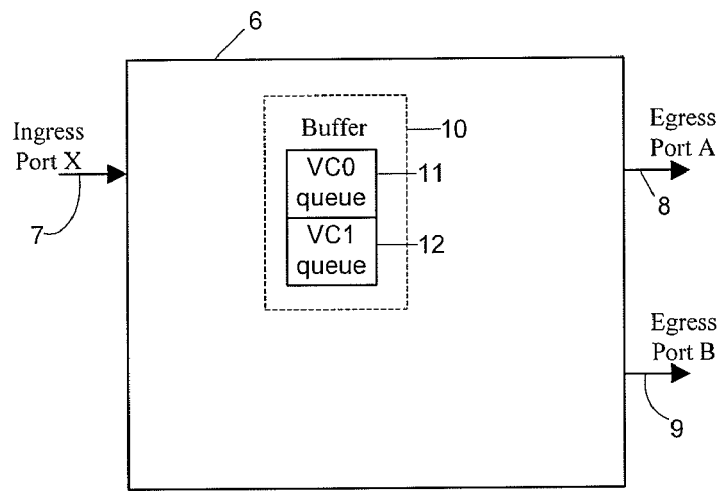
FIG. 2 is a schematic representation of a switch having an ingress port and two egress ports.
FIG. 3 is a table showing how traffic classes are mapped to virtual channels for each of the ports of the switch illustrated in FIG. 2.

FIG. 2 shows a switch 6 having an ingress port 7 and two egress ports, an egress port A 8 and an egress port B 9. Ingress port 7 supports two virtual channels, virtual channel VC0 and virtual channel VC1. Traffic class TC2 is mapped to the virtual channel VC0 while a traffic class TC3 is mapped to the virtual channel VC1.

The switch 6 comprises an ingress buffer 10 arranged to store data packets received at the ingress port 7. Within the ingress buffer 10 each virtual channel has its own ingress queue. A VC0 queue 11 is associated with the virtual channel VC0 while a VC1 queue 12 is associated with the virtual channel VC1. The egress ports 8, 9 both support two virtual channels. On egress port A 8 the traffic class TC2 is mapped to the virtual channel VC0 while the traffic class TC3 is mapped to the virtual channel VC1. On egress port B 9, the traffic class TC2 is mapped to the virtual channel VC1 while the traffic class TC3 is mapped to the virtual channel VC0. A table setting out the relationships between traffic classes and virtual channels is shown in FIG. 3.

The following examples assume that all the data packets received at the ingress port 7 are associated with traffic class TC2 and are therefore received on the virtual channel VC0.

Figure 4A:
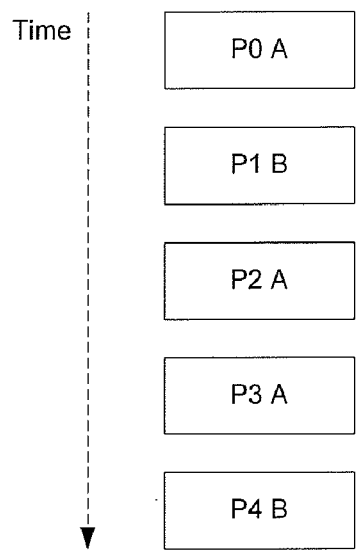
FIG. 4A is a schematic illustration of a stream of data packets which are received at the ingress port of the switch illustrated in FIG. 2.

FIG. 4A shows a stream of data packets received at the ingress port 7 of the switch 6. A data packet P0 arrives first and data packet P4 arrives last. Each data packet specifies a destination in the form of either the egress port A 8 or the egress port B 9. Upon arrival at the ingress port the received data packets are assigned to an ingress queue. The strategy used to assign data packets received at the ingress port 7 to an ingress queue is to base the selection of one of the queues 11, 12 on the virtual channel to which the relevant traffic class (here the traffic class TC2) is mapped on the relevant egress port. From the mappings shown in FIG. 3 it can be seen how the data packets of FIG. 4A are assigned to one of the two VC queues 11, 12 based upon their specified egress port.

Figure 4B:
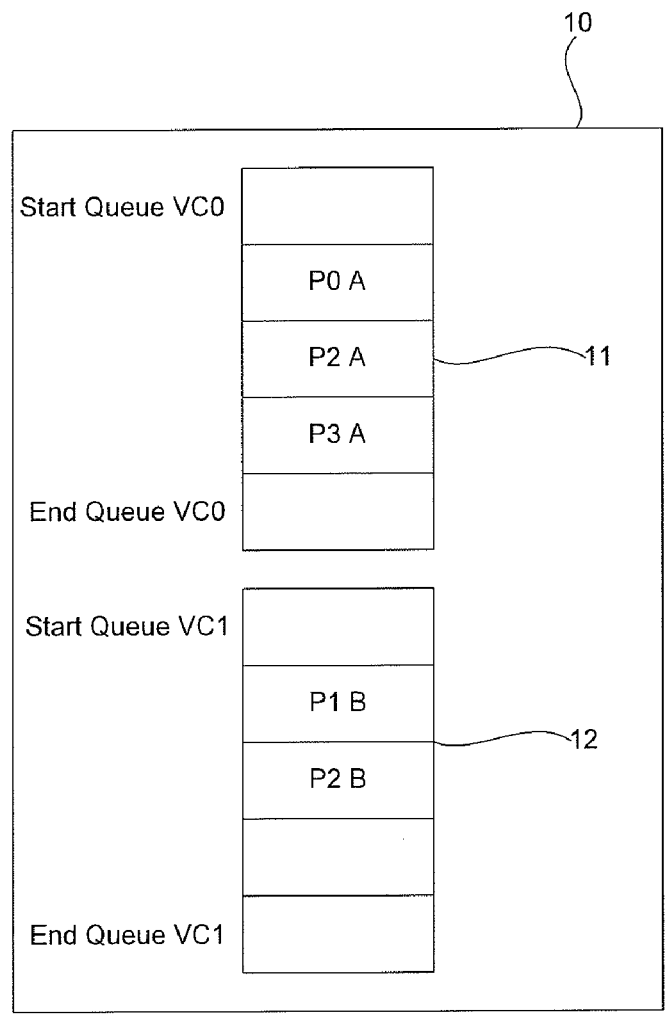
FIG. 4B is a schematic illustration of the state of an ingress buffer of the switch in FIG. 2 after receiving the stream of data packets illustrated in FIG. 4A.

FIG. 4B shows the state of the ingress queues 11, 12 of the ingress buffer 10 after the arrival of the stream of data packets shown in FIG. 4A. Data packet P0 specifies egress port A 8 as its destination. Referring to FIG. 3 it can be seen that on port A 8, the traffic class TC2 is mapped to the virtual channel VC0, therefore the data packet P0 is added to the VC0 queue 11. Data packet P1 specifies egress port B 9 as its destination. FIG. 3 specifies that the traffic class TC2 is mapped to the virtual channel VC1 on Port B 9; data packet P1 is therefore written to the VC1 queue 12. Data packets P2 and P3 also specify Port A as their destination and so are also written to the VC0 queue 11. Data packet P4 specifies Port B as its destination and so is written to the VC1 queue 12.

A write operation writing a data packet to an ingress queue requires one clock cycle, therefore unicast data packets can be written to the appropriate ingress queue in the ingress buffer for all ingress sequences, even if the received data packets are all so small that their arrival rate requires all of the write bandwidth available on the ingress buffer (i.e. a data packet arrives at each clock cycle).

A known method for the processing of multicast data packets received at the switch of FIG. 2 is now described with reference to FIGS. 5A and 5B.

Figure 5A:
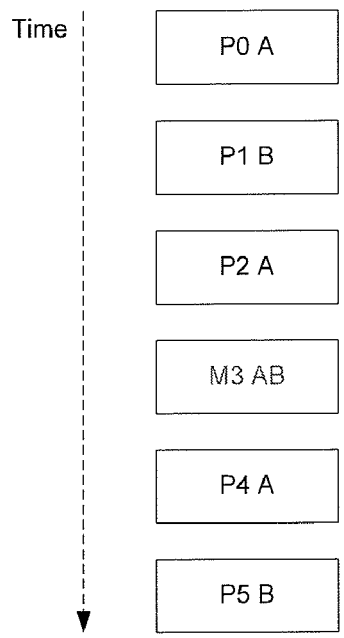
FIG. 5A is a schematic illustration of a stream of data packets, comprising both unicast and multicast data packets, which are received at the ingress port of the switch illustrated in FIG. 2.
Figure 5B:
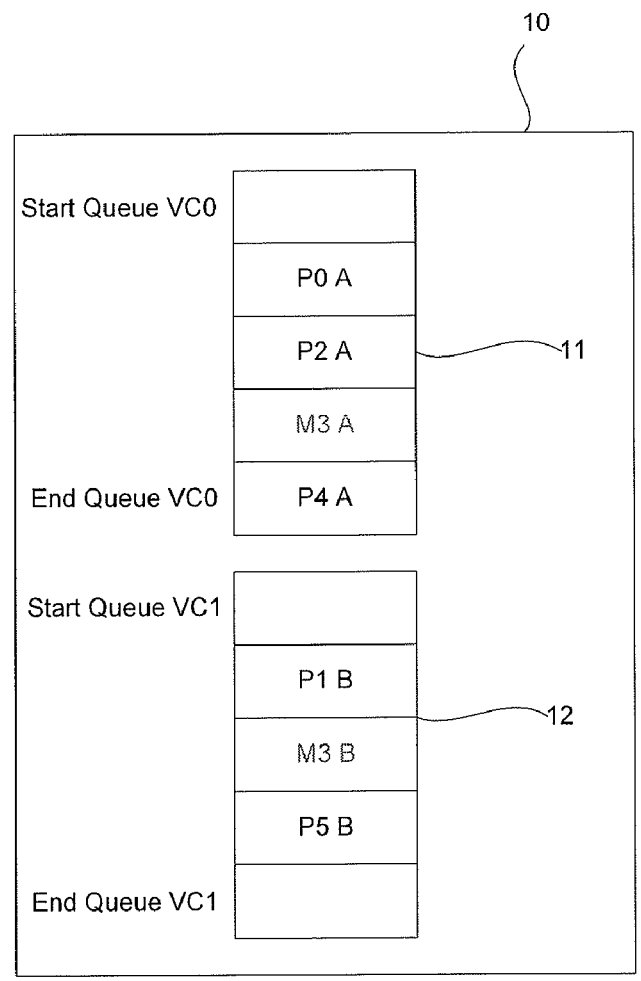
FIG. 5B is a schematic illustration of the state of the ingress buffer of the switch of FIG. 2 after receiving the stream of data packets illustrated in FIG. 5A and processing of the received data packets in a known manner.

FIG. 5A shows an ordered stream of six data packets which are received at the ingress port 7 of the switch 6. Data packets labelled 'P' are unicast data packets specifying one of either the egress port A 8 or the egress port B 9. Data packet M3 is a multicast data packet to be routed to both the egress port A 8 and the egress port B 9. The unicast data packets are processed as described with reference to FIGS. 4A and 4B, that is, they are written to one of the queues 11, 12 based upon the virtual channel to which the appropriate traffic class (here, the traffic class TC2) is mapped on the relevant egress port.

In order to ensure that the multicast data packet M3 is sent to both the egress port A 8 and the egress port B 9, the multicast data packet M3 is copied to both the VC queues 11, 12 before any other subsequent data packets are written to those queues. This is required because the traffic class TC2 is mapped to the virtual channel VC0 on the egress port A 8 and is mapped to the virtual channel VC1 on the egress port B 9. Writing the multicast data packet M3 to both of the queues 11, 12 is an operation requiring two write cycles.

Figure 6:
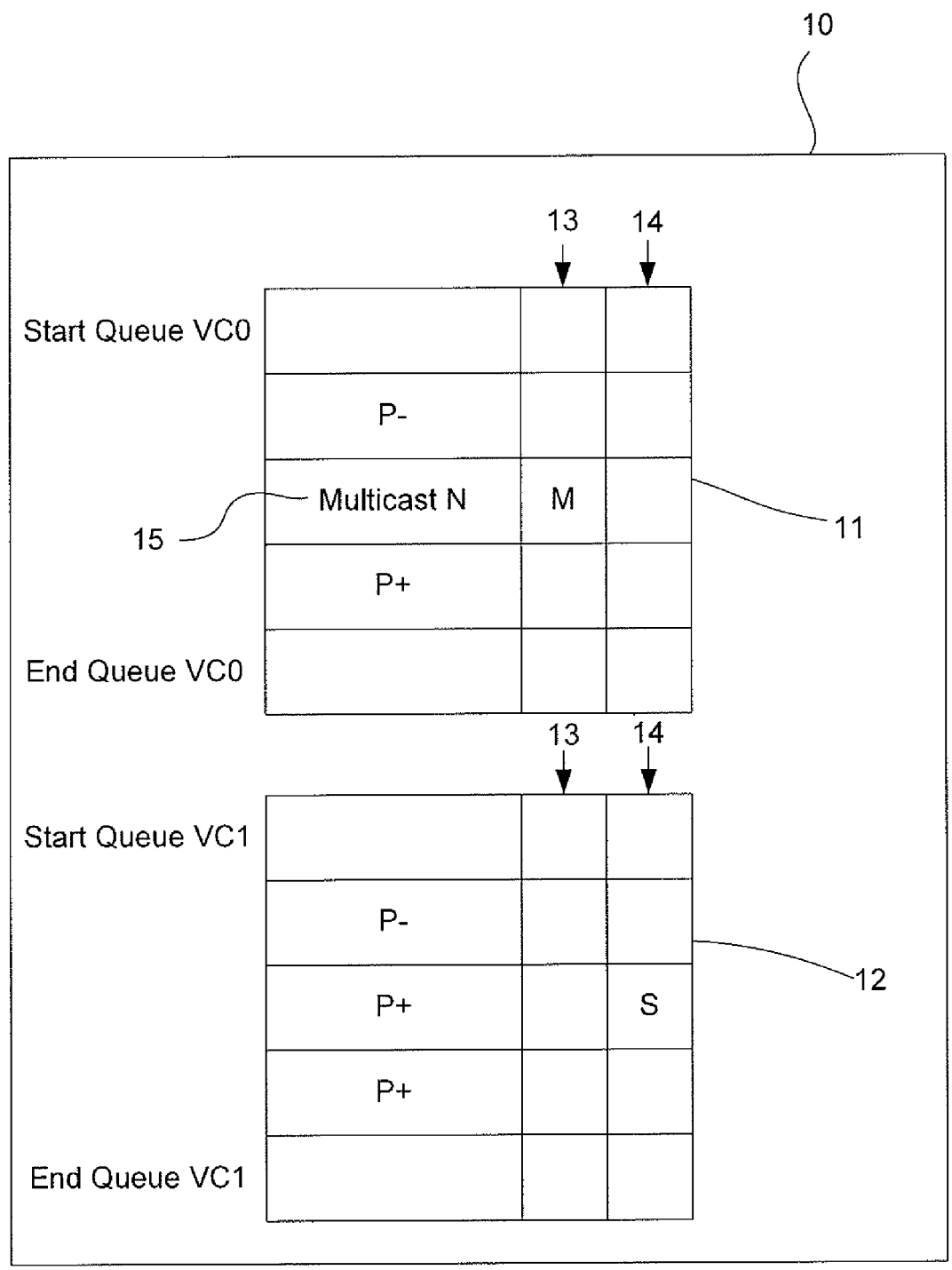
FIG. 6 is a schematic illustration of queues of data packets stored in the ingress buffer of the switch of FIG. 2 in an embodiment of the present invention.

FIG. 6 illustrates the ingress buffer 10 containing the two VC queues 11, 12 described above. Each of the queues 11, 12 is configured according to an embodiment of the present invention. Two flag bits are associated with each queue location, a Master flag 13 and a Slave flag 14. Upon arrival of a unicast data packet, that data packet is added to the end of an appropriate queue (as described with reference to FIGS. 4A and 4B). If a multicast data packet is received, the data packet is written to the queue indicated by an external toggle. The purpose of the toggle is to indicate a queue to which a multicast data packet should be written. The toggle functions to indicate a queue other than that which last received a multicast data packet; in this example the toggle indicates the VC0 queue 11 upon arrival of a multicast data packet 15, and the multicast data packet 15 is therefore written to the VC0 queue 11. Upon the multicast data packet 15 being written to a queue location of the queue 11 the toggle is modified to indicate the VC1 queue 12.

The Master flag bit 13 is set at the location of the VC0 queue 11 at which the multicast data packet is stored, denoted here by 'M'.

The next data packet to be written to the VC1 queue 12, arriving after the multicast data packet (and while the multicast data packet 15 is still queued in the VC0 queue 11) will have the slave flag 14 set in its queue, denoted here by 'S'. Setting the Slave flag requires no additional bandwidth.

After a Master flag has been added to a particular entry in a particular queue, it is necessary to record that the next data packet stored in the other queue must be marked with a Slave flag. If the other queue does not receive a subsequent data packet by the time the Master flag leaves its own queue, the Slave flag can be discarded.

Figure 7:
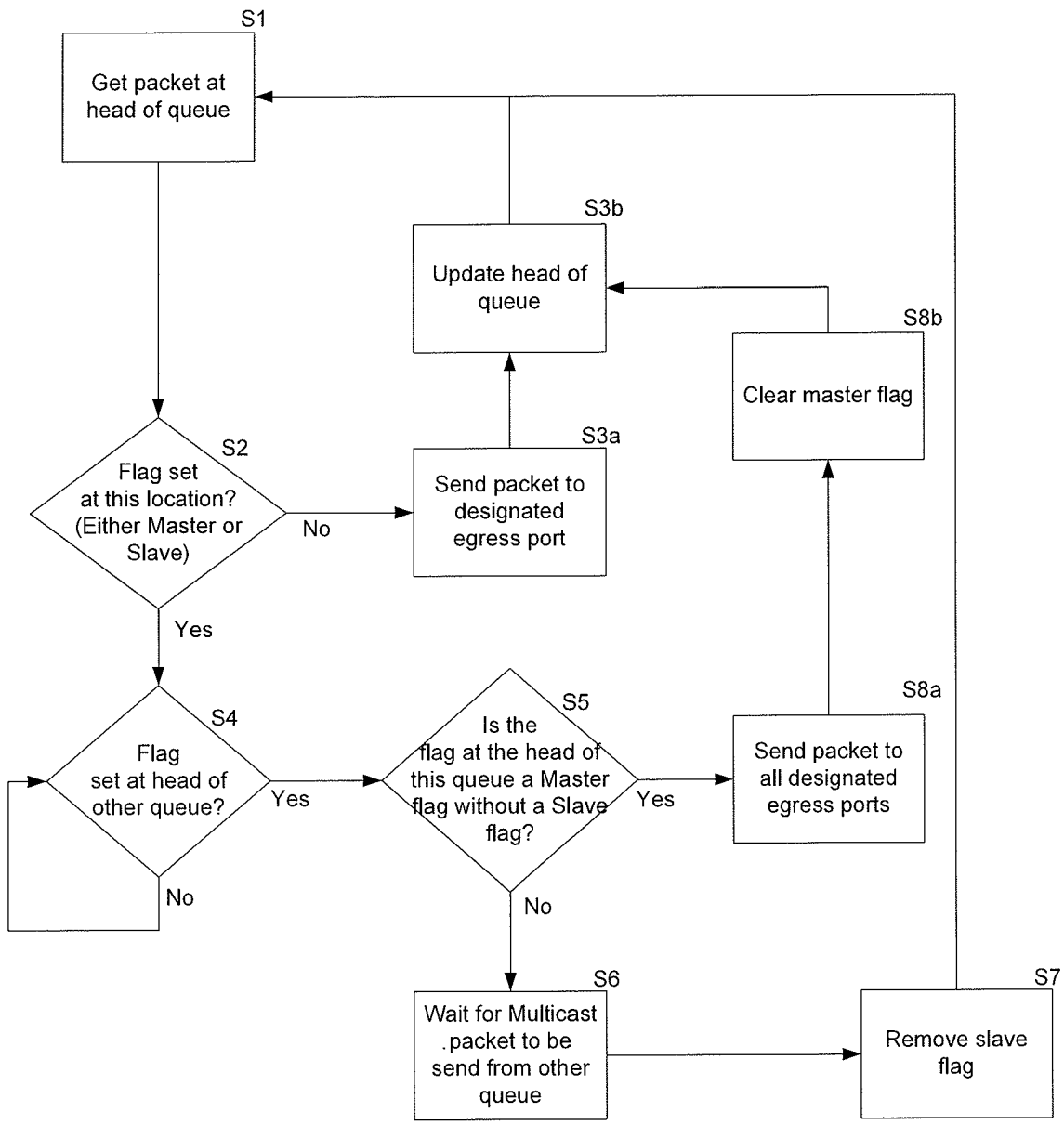
FIG. 7 is a flow chart showing the processing of a queue of data packets stored in the ingress buffer FIG. 6.

Referring to FIG. 7, this schematically illustrates in the form of a flow chart the processing of an ingress queue in the embodiment of the present invention described with reference to FIG. 6. The flow chart illustrates the processing of each of the VC0 queue 11 and the VC1 queue 12. Each queue can be processed independently until a flag of either type (Master or Slave) is detected at the head of either queue.

In the following explanation FIG. 7 is described with reference to the VC0 queue 11, the processing of the VC1 queue 12 being analogous. Processing starts at step S1 when a data packet is retrieved from the head of the VC0 queue 11. Processing passes to step S2 where it is determined whether retrieved data packet is marked with either a master flag or a slave flag. If the data packet is not marked with a flag processing passes to step S3a where the retrieved data packet is sent to the relevant egress port. Processing then passes to step S3b where the queue is moved along such that the head of the queue is set to be the next entry in the queue. Processing then returns to step S1. It will be appreciated that where only unicast data packets are present in all queues, the processing of steps S1, S2, S3 and S3b can repeat to process all unicast data packets.

If the check of step S2 determines that the processed data packet of the VC0 queue 11 is marked with a flag, processing passes to step S4 where it is determined whether there is also a flag associated with the entry at the head of the VC1 queue 12. If there is no flag associated with the entry at the head of the VC1 queue 12, processing remains at step S4 and no other entries of the VC0 queue 11 are processed until there is a flag at the head of the VC1 queue 12.

When a flag is found associated with the entry at the head of the VC1 queue 12 processing passes from step S4 to step S5, where it is determined whether the flag at the head of the VC0 queue 11 is a Master flag. If the flag associated with the entry at the head of the VC0 queue 11 is not a Master flag (i.e. the flag associated with the entry at the head of the VC0 queue 11 is a slave flag) then processing of the VC0 queue 11 waits for a multicast data packet to be sent from the VC1 queue 12 at step S6, before processing continues at step S7 where the slave flag associated with the entry at the head of the VC0 queue 11 is removed. Processing then returns to step S1, the head of the VC0 queue being unchanged.

If the flag marking the data packet at the head of the VC0 queue 11 is a Master flag then the data packet at the head of the VC0 queue 11 is a multicast data packet and processing passes from step S5 to step S8. At step S8a the multicast data packet at the head of the VC0 queue 11 is sent to both the egress port A 8 and the egress port B 9. At step S8b the master flag associated with the entry at the head of VC0 queue 11 is removed. Processing then passes to step S3b where the head of the queue is updated.

Figure 8:
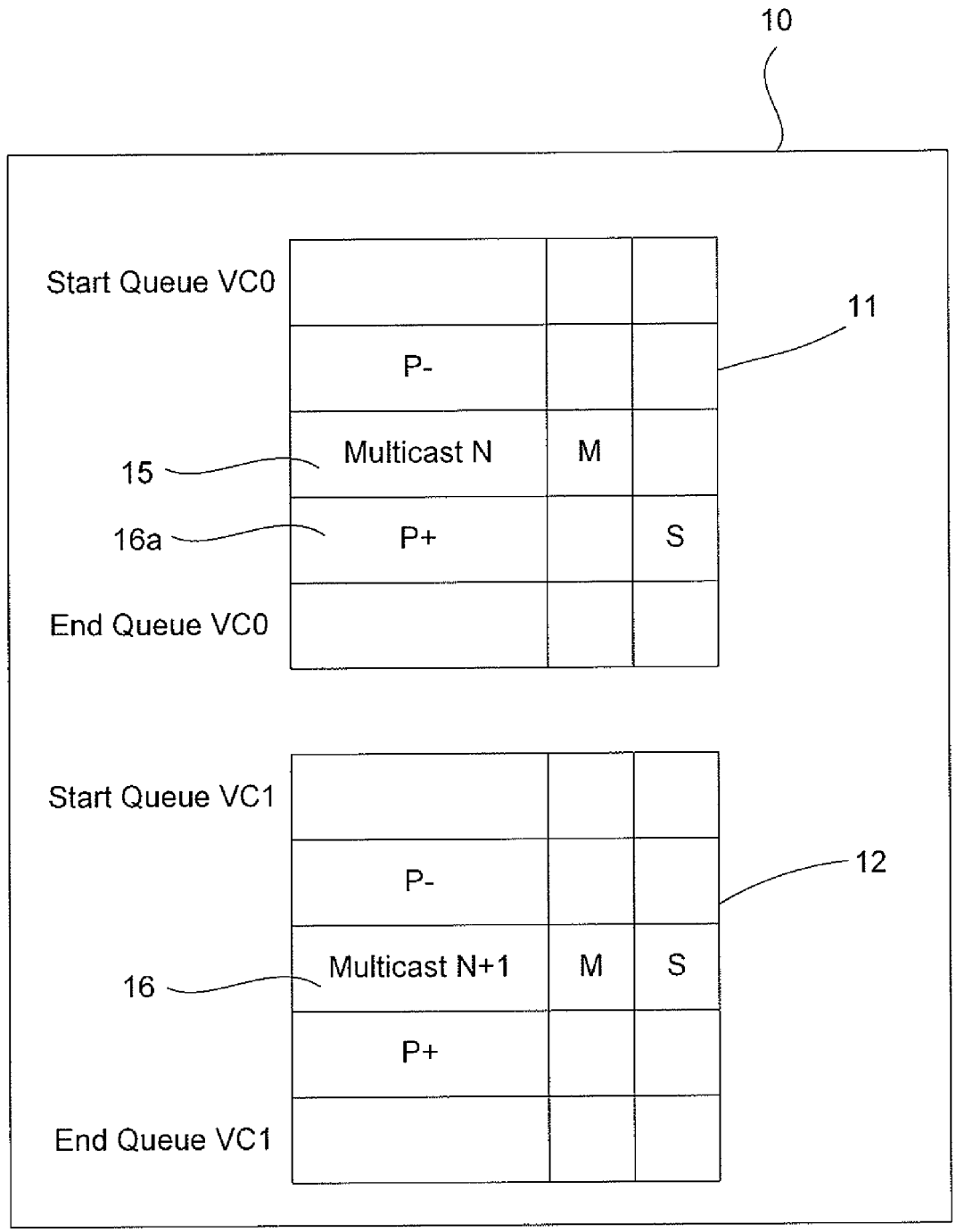
FIG. 8 is a further schematic illustration of queues of data packets stored in the ingress buffer of the switch of FIG. 2 in an embodiment of the present invention.

By indicating a next queue in which a multicast data packet should be stored, the toggle allows the system to process contiguously received multicast data packets, as is now described with reference to FIG. 8. Here, after the multicast data packet 15 is stored in the VC0 queue 11 the toggle indicates the VC1 queue 12 so that a next multicast data packet 16 is stored in the VC1 queue 12. Multicast data packet 16 is marked with two flags, both a Master flag and a Slave flag. The Slave flag indicates that the multicast data packet 16 is to be transmitted after the multicast data packet N 15. The Master flag indicates that any data packet entering the VC0 queue 11, after the receipt of the multicast data packet 16 (the data packet 16a in FIG. 8) is to wait for the multicast data packet 16 to be sent. The correct ordering is ensured as a Slave flag is selected (at step S5) in preference to a Master flag when both are associated with a particular queue entry.

Another embodiment of the present invention is arranged to operate with three queues, each associated with a particular virtual channel, and such an embodiment is now described.

Figure 9:
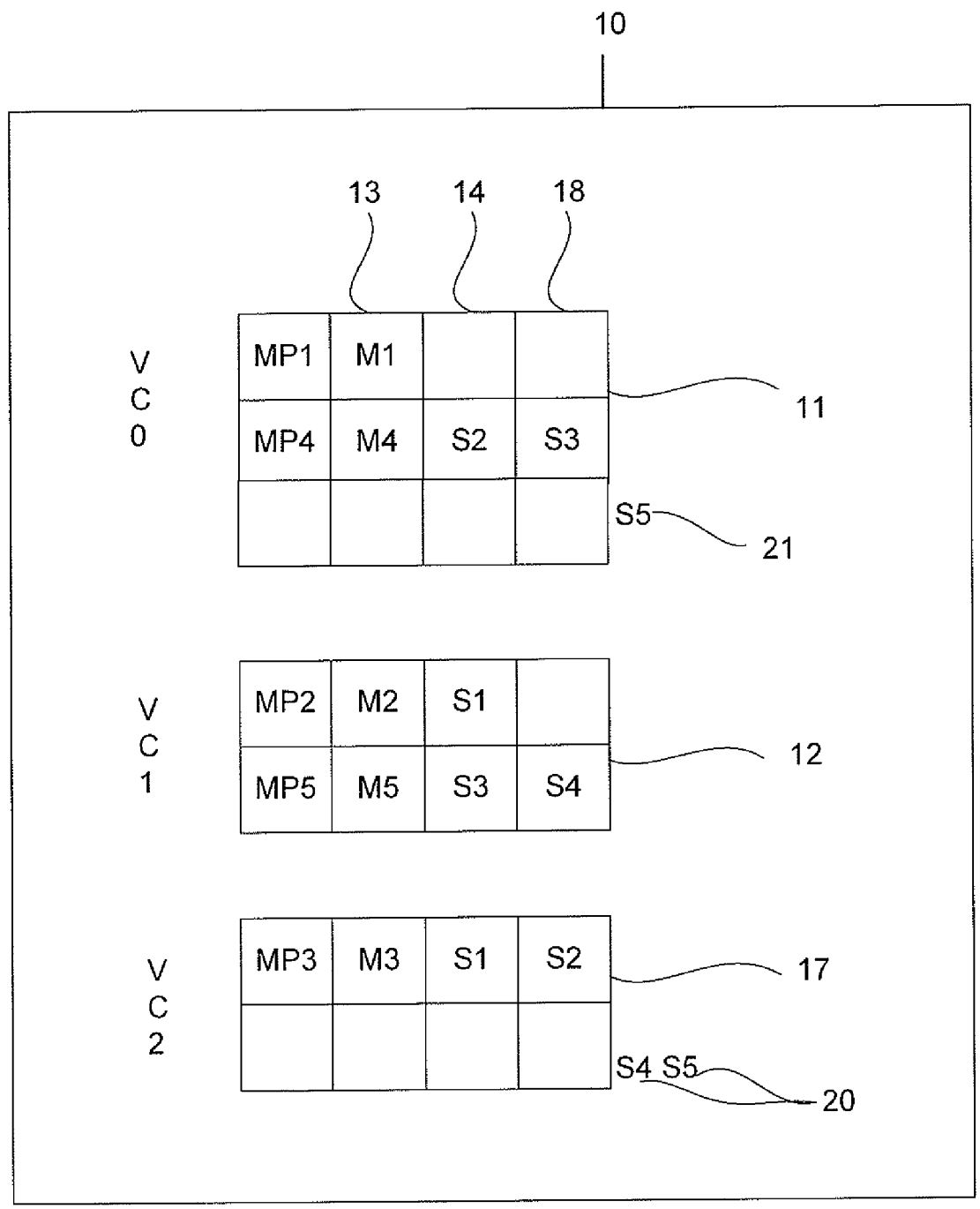
FIG. 9 is a schematic illustration of three queues of data packets stored in the ingress buffer of the switch of FIG. 2 in an embodiment of the present invention.

FIG. 9 is a schematic illustration showing the buffer 10 providing three queues 11, 12, 17, each associated with a respective virtual channel. Each queue entry has three flags, the Master flag 13 and the Slave flag 14 described above, and a further Slave flag 18. In FIG. 9 the multicast data packets have labels MP1 to MP5 such that multicast data packet MP1 arrives first and multicast data packet MP5 arrives last. The Master flags are similarly labelled M1 to M5 where the numeral of the Master flag corresponds to the numeral of the label of the multicast data packet with which the flag is associated. The label of each Slave flag indicates a Master flag with which the Slave flag corresponds. For example, Slave flag S1 is associated with the entries in the VC1 queue 12 and the VC2 queue 17 to ensure the correct ordering of these entries given the presence of the multicast data packet MP1 in the VC0 queue 11.

Two slave flags S4 and S5 20 associated with the VC2 queue 17 and the slave flag S5 21 associated with the VC0 queue 11 are waiting for a data packet to be added to the relevant queue and are therefore shown outside of the queue locations to which they would be added upon arrival of a data packet at that location.

An algorithm arranged to process the queues shown in FIG. 9 is now described. The algorithm is arranged to operate both for Slave flags associated with a particular queue location, and any pending external Slave flags waiting to be added to an otherwise empty entry in a queue (such as flags 20, 21 in FIG. 9).

Queues can be processed independently until any flag type (Master or Slave) is found at the head of any queue, at which point an algorithm having the following structure can be used:

If any flag (Master or Slave) is associated with an entry at the head of a queue, pause processing that queue until all other queues have an entry with an associated flag (Master or Slave) set at their head;

Find the queue that contains an isolated Master flag only (i.e. where all Slave flags are not set at that queue entry)

Figure 10:
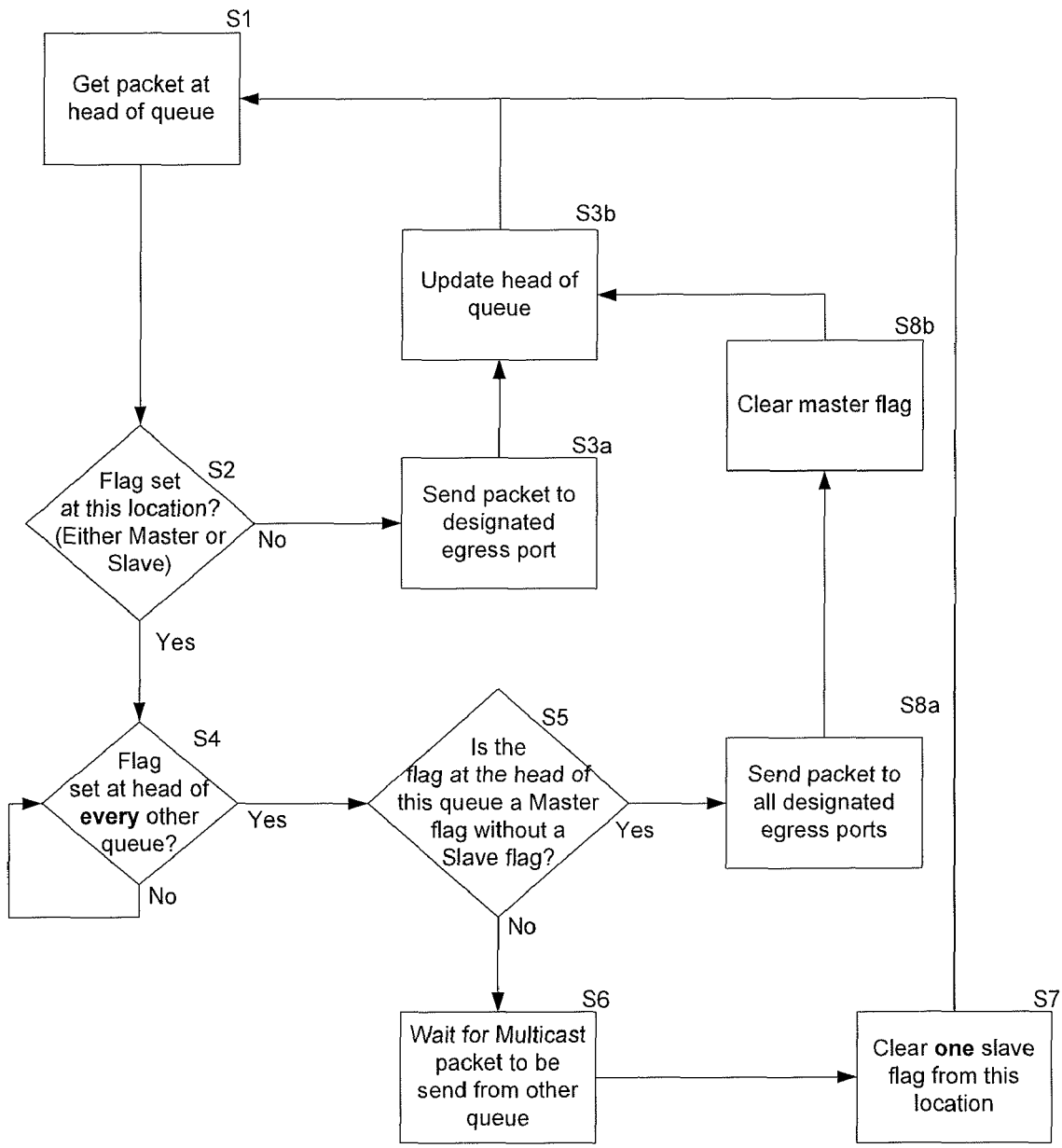
FIG. 10 is a flow chart of an algorithm for processing the queues shown in FIG. 9.

Transmit the data packet marked with an isolated Master flag, clear the isolated Master flag, and clear one Slave flag from the entry at the head of each other queue;

If any flag remains set at the head of any queue, repeat the algorithm from step 1, otherwise return to processing the queues independently FIG. 10 is a schematic illustration of the algorithm given above in the form of a flow chart. The method is similar to that for processing two queues described with reference to FIG. 7, with minor changes.

Processing of steps S1, S2, S3a and S3b is as described with reference to FIG. 7. At step S4 a check is carried out to determine whether a flag is associated with the entry at the head of each queue. Processing remains at step S4 until this condition is satisfied.

Processing of steps S5, S6, S7, S8a and S8b is as described with reference to FIG. 7, although it is to be noted that at S5 an isolated master flag (i.e. having no associated slave flags) is sought and at step S7 a Slave flag is removed from the entry at the head of each queue other than that queue containing the isolated Master flag.

FIGS. 11A to 11E are schematic illustrations showing how the three queues 11, 12, 17 of FIG. 9 are processed by the algorithm shown in FIG. 10.

Figure 11A:
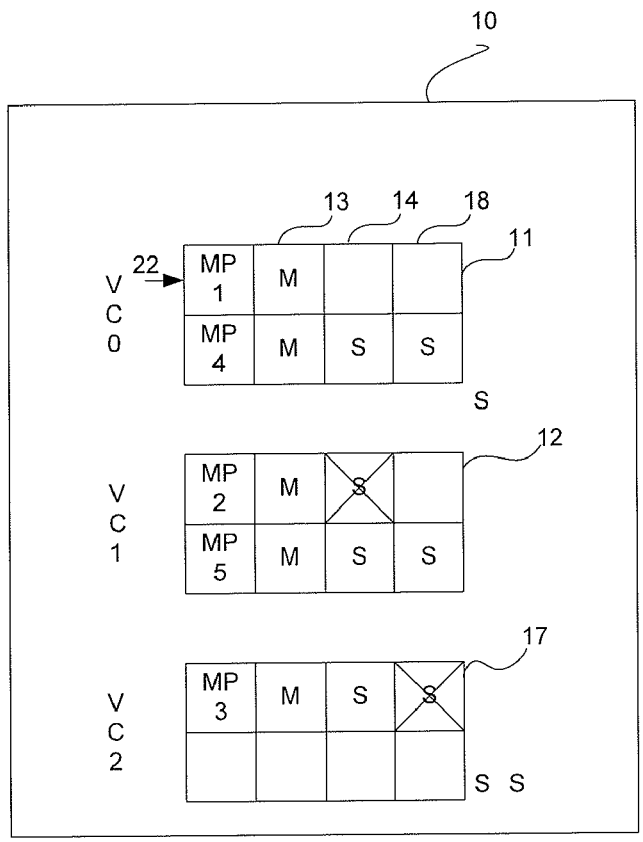
FIGS. 11A to 11E are schematic illustrations showing how the queues of data packets shown in FIG. 9 are modified by the processing of FIG. 10.

FIG. 11A shows the contents of the buffer 10 as shown in FIG. 9. A flag associated with the entry at the head of each of the queues is set. A queue containing an isolated Master flag is determined (step S5) which in this case is the VC0 queue 11 as indicated by an arrow 22 at the head of the VC0 queue 11. The data packet MP1 marked with the isolated Master flag is transmitted and the VC0 queue 11 is advanced. One slave flag associated with an entry at the head of each of the VC1 queue 12 and the VC2 queue 17 is cleared as indicated by crosses in FIG. 11A.

Figure 11B:
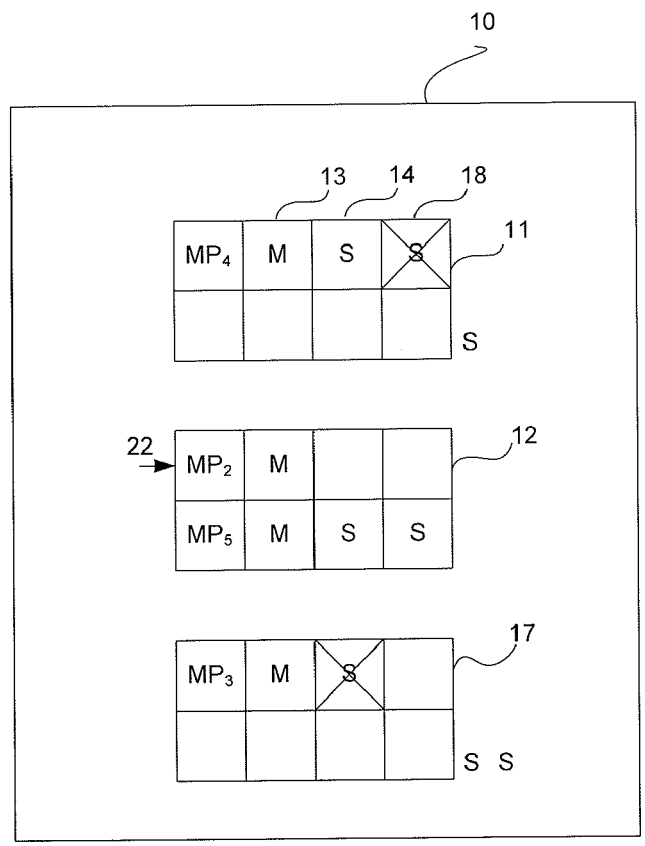

FIG. 11B shows the contents of the buffer 10 after data packet MP1 has been sent and a Slave flag has been removed from each of the VC1 queue 12 and the VC2 queue 17. It remains the case that there is a flag associated with the entry at the head of each queue, thus the algorithm will proceed as described with reference to FIG. 11A. That is, the queue containing an entry associated with the isolated Master flag will be found, in this case the VC1 queue 12 as indicated by the arrow 22. The data packet contained in that queue location, data packet MP2, will be transmitted, and one Slave flag associated with an entry at the head of each of the VC0 queue 11 and the VC2 queue 17 will be cleared as indicated by the crosses.

Figure 11C:
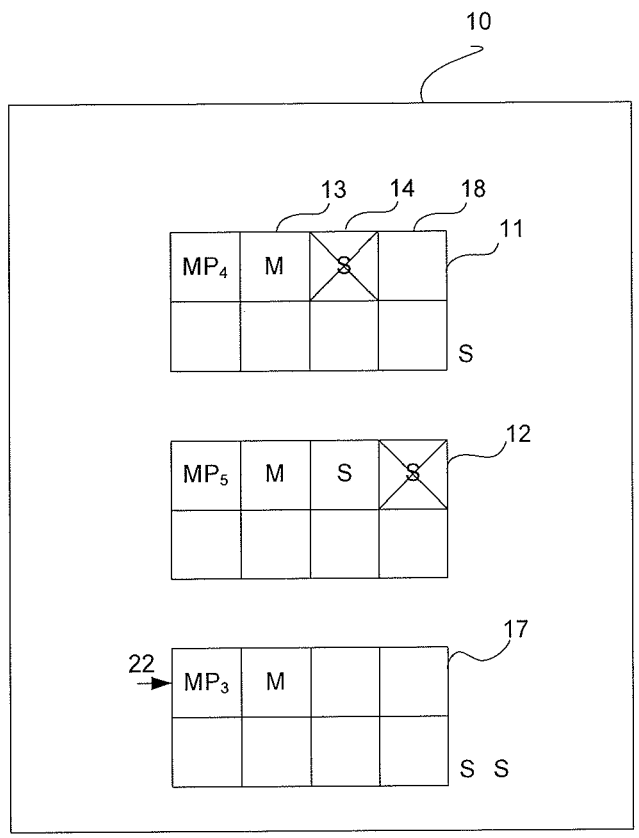

FIG. 11C shows the contents of the buffer after the processing described with reference to FIG. 11B. In this case the isolated Master flag is associated with the entry at the head of the VC2 queue 17 as indicated by the arrow 22. The data packet MP3 is therefore transmitted, and a Slave flag is cleared from entries at the head of both the VC0 queue 11 and the VC1 queue 12 as indicated by the crosses, leaving the buffer as shown in FIG. 11D.

Figure 11D:
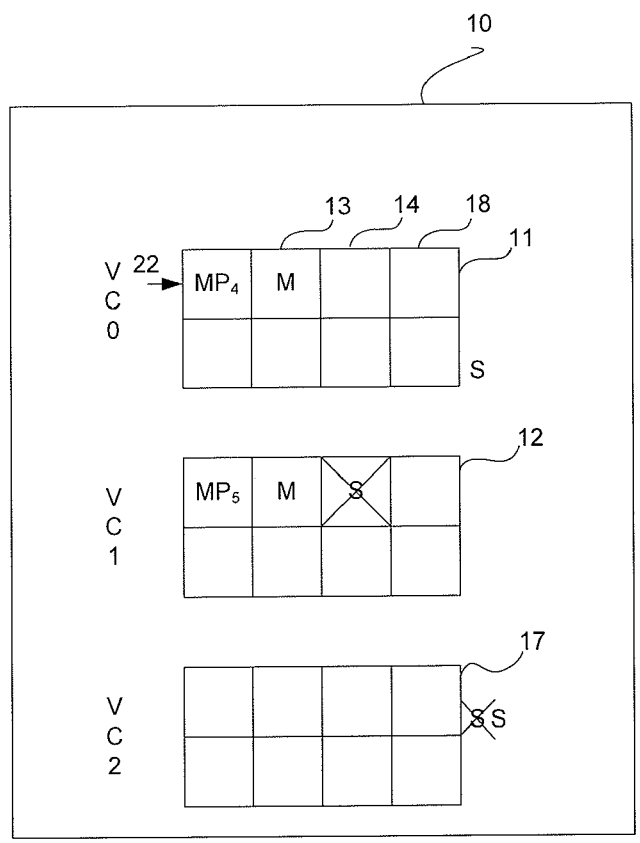

With reference to FIG. 11D, the VC2 queue 17 does not contain any data packets, but there remain two Slave flags waiting to be set should a data packet be written to this queue. It is therefore still the case that a flag exists at the head of every queue and the algorithm will repeat. Data packet MP4 is transmitted from the VC0 queue 11 and a Slave flag is cleared from the heads of both the VC1 queue 12 and the VC2 queue 17 as indicated by the crosses, leaving the buffer as shown in FIG. 11E.

Figure 11E:
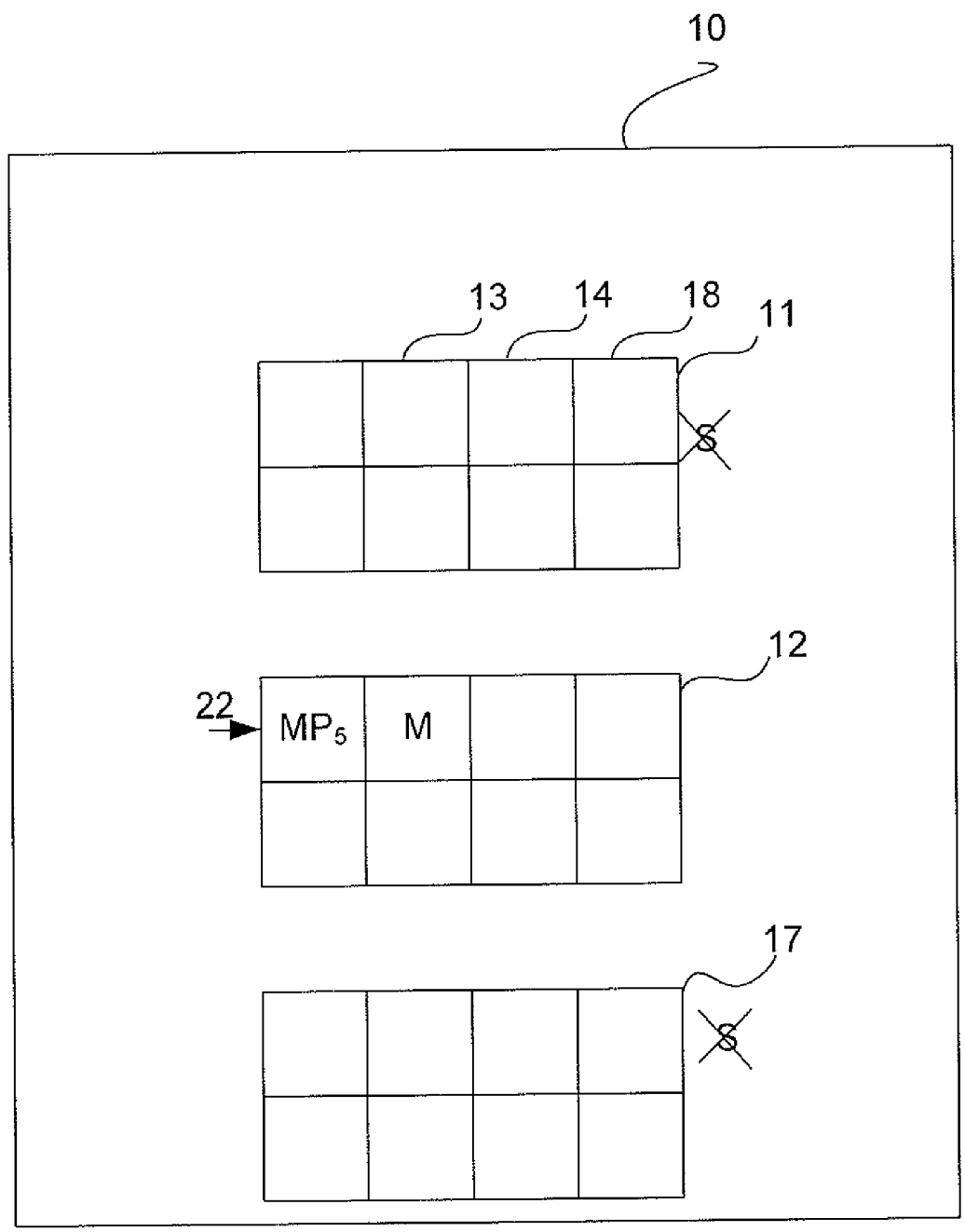

With reference to FIG. 11E, the only data packet remaining to be sent is data packet MP5 in the VC1 queue 12, although it is still the case that the VC0 queue 11 and the VC2 queue 17 have Slave flags waiting to mark the next data packets subsequently received into the VC0 queue 11 and the VC2 queue 17 respectively. In this pass of the algorithm the data packet MP5 is transmitted and the two remaining Slave flags are cleared from the heads of the VC0 queue 11 and the VC2 queue 17.

It will be apparent to those skilled in the art that although the embodiment described with reference to FIGS. 9 to 11 makes use of a plurality of individual Slave flags associated with a particular queue entry, other methods of tracking the number of Slave flags attached to a queue entry, for example a small counter, could also be used.

Further, it will be apparent to those skilled in the art that there is no particular constraint on the implementation of the ingress queues. The ingress queues could be implemented in any suitable way including as a linked list, using a circular buffer or using any other suitable method.

When accommodating more than two virtual channels on an ingress port and consequently when providing more than two queues within the ingress buffer a simple toggle is no longer sufficient to specify a queue to which a next multicast data packet should be directed. In the embodiment described in FIGS. 9 to 11 a three-way register is used for this purpose. In embodiments containing n queues, an n-way register or any other appropriate state indicator can be used.

With regard to embodiments using n queues, it should be noted that as n increases, so does the amount of queue interaction, thus, to maximise the efficiency of the method of the present invention it is important to control the number of queues.

It should be noted that in the described embodiments of the invention each Virtual Channel has a separate queue. This has the effect that it imposes a stricter than necessary ordering on the data packets arriving in each queue. That is, ordering is imposed within data packets of a virtual channel rather than only within data packets of a traffic class. For example, if the VC0 queue receives two data packets, data packet N of TC1 and subsequently data packet N+1 of TC2, it is not the case that the data packet N+1 must be sent after data packet N, although such ordering is provided by the embodiments described above.

While it is the case that the embodiments of the present invention as described above have particular relevance to PCI express switches, the method is generally applicable to any switching application where it is necessary to send data packets from an input to a plurality of outputs where the output is any combination of a port, a link, a virtual channel or a traffic class. Indeed, while the preceding description has been based upon hierarchically associated traffic classes, virtual channels and ports, and data packets have been processed based upon such concepts, it will be appreciated that embodiments of the invention can be used with any devices having inputs and outputs regardless of the way in which such inputs and outputs are defined and configured.

It will be appreciated that embodiments of the present invention can be implemented in any conventional way. For example the switch of FIG. 2 may be a hardware device comprising random access memory arranged to store the buffer 10 and a processor arranged to control receipt and transmission of data packets as well as to control operation of the buffer 10. The processor may take any convenient form including an application specific integrated circuit or a general-purpose microprocessor which is appropriately programmed.

Further modifications and applications of the present invention will be readily apparent to the appropriately skilled person from the teaching herein, without departing form the scope of the appended claims.

The invention claimed is:

1. A method of switching data packets between an input and a plurality of outputs of a switching device, the switching device comprising a memory arranged to store a plurality of data structures, each data structure being associated with one of said outputs, the method comprising:
   receiving a first data packet at said input;
   storing said first data packet in a data structure associated with an output from which said first data packet is to be transmitted;
   receiving an ordered plurality of data packets;
   storing each of said plurality of data packets in one of said data structures;
   if said first data packet is intended to be transmitted from a plurality of said outputs, storing indication data in each of said data structures associated with an output from which said first data packet is to be transmitted, said first data packet being stored in only one of said data structures, said indication data comprising slave indication data, said slave indication data being stored in each data structure associated with an output from which said first data packet is to be transmitted except the data structure in which said first data packet is stored and said slave indication data being stored alongside one data packet stored in each data structure except the data structure in which said first data packet is stored, said one data packet in each data structure being received after said first data packet is stored, and before any other data packet is stored in the respective data structure;
   transmitting said first data packet from said data structure to the or each output from which the first data packet is to be transmitted.

2. The method according to claim 1 wherein said indication data is a single bit indicator.

3. The method according to claim 1, wherein said indication data comprises master indication data, and the method further comprises:
   storing said master indication data in said data structure in which said first data packet is stored.

4. The method according to claim 1, further comprising:
   processing each of said data structures to determine a data packet to be transmitted from an output associated with each data structure; and
   if a data packet to be transmitted from one of said data structures has associated indication data, delaying transmission of said data packet until it is determined that data packets to be transmitted from each of said outputs have associated indication data.

5. The method according to claim 1, wherein each of said outputs is an egress port.

6. The method according to claim 1, wherein each of said outputs is a virtual channel on a port.

7. The method according to claim 1, wherein each of said outputs is a virtual channel on a port associated with a traffic class.

8. The method according to claim 1, further comprising: storing data structure indication data indicating a data structure in which a data packet to be transmitted from a plurality of outputs is to be stored.

9. The method according to claim 8, wherein said switching device comprises two outputs each having an associated data structure, and the data structure indication data comprises one bit of data.

10. The method according to claim 8 wherein said switching device comprises n outputs each having an associated data structure, and said data structure indication data comprises a data value capable of indicating n values.

11. The method according to claim 10 wherein said data structure indication data comprises an n-way register.

12. The method according to claim 8, wherein the method comprises: updating said data structure indication data in a circular manner.

13. The method according to claim 1, wherein said data structures are queues.

14. The method according to claim 1, wherein said switching device is a PCI express switch.

15. A non-transitory carrier medium carrying computer readable code for controlling a computer to carry out the method of claim 1.

16. A switching device, the switching device comprising:
   a memory storing processor readable instructions; and
   a processor configured to read and execute instructions stored in said memory;
   wherein said processor readable instructions comprise instructions controlling the processor to carry out a method according claim 1.

17. A method of switching data packets between an input and a plurality of outputs of a switching device, the switching device comprising a memory arranged to store a plurality of data structures, each data structure being associated with one of said outputs, the method comprising:
   receiving an ordered plurality of data packets at said input;
   storing each of said plurality of data packets in one of said data structures associated with an output from which said data packet is to be transmitted;
   if a data packet of said plurality of packets is intended to be transmitted from a plurality of said outputs, storing indication data in each data structure associated with an output from which said data packet is to be transmitted, said data packet being stored in only one of said data structures;
   processing each of said data structures to determine a data packet to be transmitted from an output associated with each data structure;
   if a data packet to be transmitted from one of said data structures has associated indication data, delaying transmission of said data packet until it is determined that data packets to be transmitted from each of said outputs have associated indication data;

determining a data packet having associated master indication data and no slave indication data; and transmitting said determined data packet to each output from which it is to be transmitted.

18. The method according to claim 17, further comprising:

determining if slave indication data is associated with an entry in any data structure other than that storing said data packet having associated master indication data and no slave indication data; and clearing determined slave indication data in each data structure except said data structure.

19. A switching device for switching data packets between an input and a plurality of outputs comprising:

at least one input for receiving data packets including a first data packet;

a plurality of outputs from which the received data packets are to be transmitted;

a memory arranged to store a plurality of data structures, each data structure being associated with one of said outputs;

circuitry configured to:

receive an ordered plurality of data packets;

store each of said plurality of data packets in one of said data structures;

determine whether said first data packet is intended to be transmitted from a plurality of said outputs; and store indication data such that if said first data packet is intended to be transmitted from a plurality of said outputs, indication data is stored in each data structure associated with an output from which said first data packet is to be transmitted, said first data packet being stored in only one of said data structures;

wherein said indication data comprises slave indication data, and the circuitry is arranged to store said slave indication data alongside one data packet stored in each data structure associated with an output from which said first data packet is to be transmitted except the data structure in which said first data packet is stored, said one data packet in each data structure being received after said first data packet is stored, and before any other data packet is stored in the respective data structure.

20. The switching device according to claim 19 wherein said indication data is a single bit indicator.

21. The switching device according to claim 19, wherein said indication data comprises master indication data, and the switching device is arranged to store said master indication data in said data structure in which said data packet is stored.

22. The switching device according to claim 19, wherein the circuitry is arranged to:

process each of said data structures to determine a data packet to be transmitted from an output associated with each data structure; and if a data packet to be transmitted from one of said data structures has associated indication data, to delay transmission of said data packet until it is determined that data packets to be transmitted from each of said outputs have associated indication data.

23. The switching device according to claim 19, wherein the memory is arranged to store data structure indication data indicating a data structure in which a data packet to be transmitted from a plurality of outputs is to be stored.

24. An apparatus for switching data packets between an input and a plurality of outputs comprising:

at least one input for receiving data packets;

a plurality of outputs from which the received data packets are to be transmitted;

means for receiving a first data packet;

means for storing said first data packet in a data structure associated with an output from which said data packet is to be transmitted;

means for receiving an ordered plurality of data packets;

means for storing each of said plurality of data packets in one of said data structures;

means for determining whether said first data packet is intended to be transmitted from a plurality of said outputs, and if said first data packet is intended to be transmitted from a plurality of said outputs for storing indication data in each data structure associated with an output from which said first data packet is to be transmitted, said indication data including slave indication data stored in each data structure associated with an output from which said first data packet is to be transmitted except for the data structure in which said first data packet is stored, said first data packet being stored in only one of said data structures; and means for transmitting said first data packet from said data structure to the or each output from which the first data packet is to be transmitted.

25. A switching device for switching data packets between an input and a plurality of outputs comprising:

at least one input for receiving data packets including a first data packet;

a plurality of outputs from which the received data packets are to be transmitted;

a memory arranged to store a plurality of data structures, each data structure being associated with one of said outputs;

circuitry configured to:

receive an ordered plurality of data packets at said input;

store each of said plurality of data packets in one of said data structures associated with an output from which said data packet is to be transmitted;

if a data packet of said plurality of packets is intended to be transmitted from a plurality of said outputs, to store indication data in each data structure associated with an output from which said data packet is to be transmitted, said data packet being stored in only one of said data structures;

process each of said data structures to determine a data packet to be transmitted from an output associated with each data structure;

if a data packet to be transmitted from one of said data structures has associated indication data, delay transmission of said data packet until it is determined that data packets to be transmitted from each of said outputs have associated indication data;

determine a data packet having associated master indication data and no slave indication data; and transmit said determined data packet to each output from which it is to be transmitted.

26. An apparatus for switching data packets between an input and a plurality of outputs comprising:

at least one input for receiving data packets;

a plurality of outputs from which the received data packets are to be transmitted;

means for receiving an ordered plurality of data packets;

means for storing each of said plurality of data packets in one of said data structures associated with an output from which said data packet is to be transmitted;

means for, if a data packet of said plurality of packets is intended to be transmitted from a plurality of said outputs, storing indication data in each data structure associated with an output from which said first data packet is to be transmitted, said data packet being stored in only one of said data structures;

means for processing each of said data structures to determine a data packet to be transmitted from an output associated with each data structure;

means for, if a data packet to be transmitted from one of said data structures has associated indication data, delaying transmission of said data packet until it is determined that data packets to be transmitted from each of said outputs have associated indication data;

means for determining a data packet having associated master indication data and no slave indication data; and means for transmitting said determined data packet to each output from which it is to be transmitted.

* * * * *